June 12, 1934.  C. P. WAGNER ET AL  1,963,005
FLOUR SAVING MEANS FOR DOUGH BRAKES
Filed April 16, 1932   3 Sheets-Sheet 1

Inventors
Charles P. Wagner
Wiltz W. Wagner
By Baldwin & Wight
Attorneys

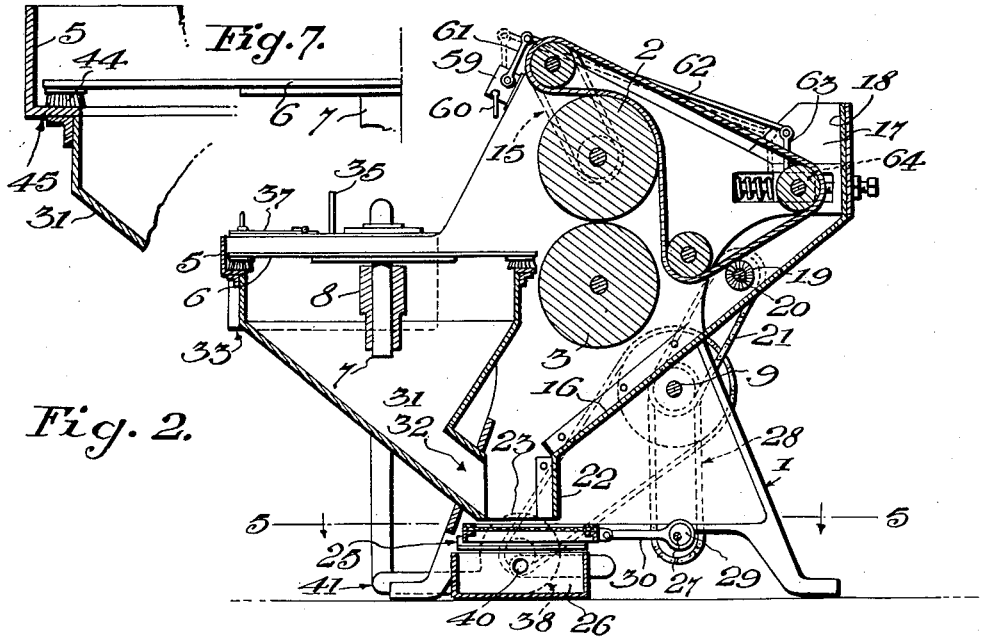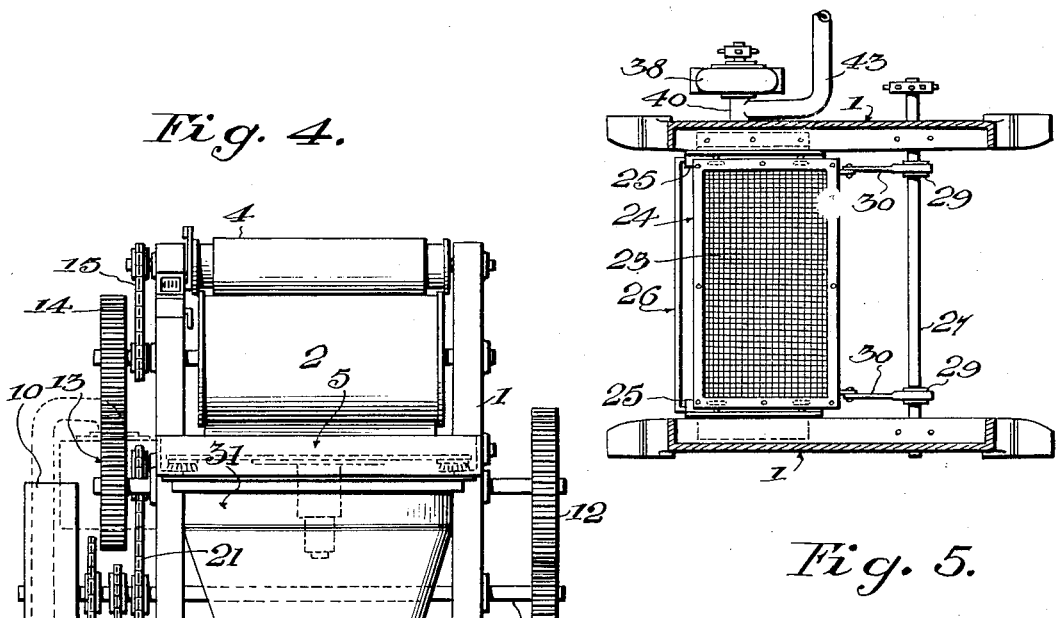

June 12, 1934.  C. P. WAGNER ET AL  1,963,005
FLOUR SAVING MEANS FOR DOUGH BRAKES
Filed April 16, 1932   3 Sheets-Sheet 3
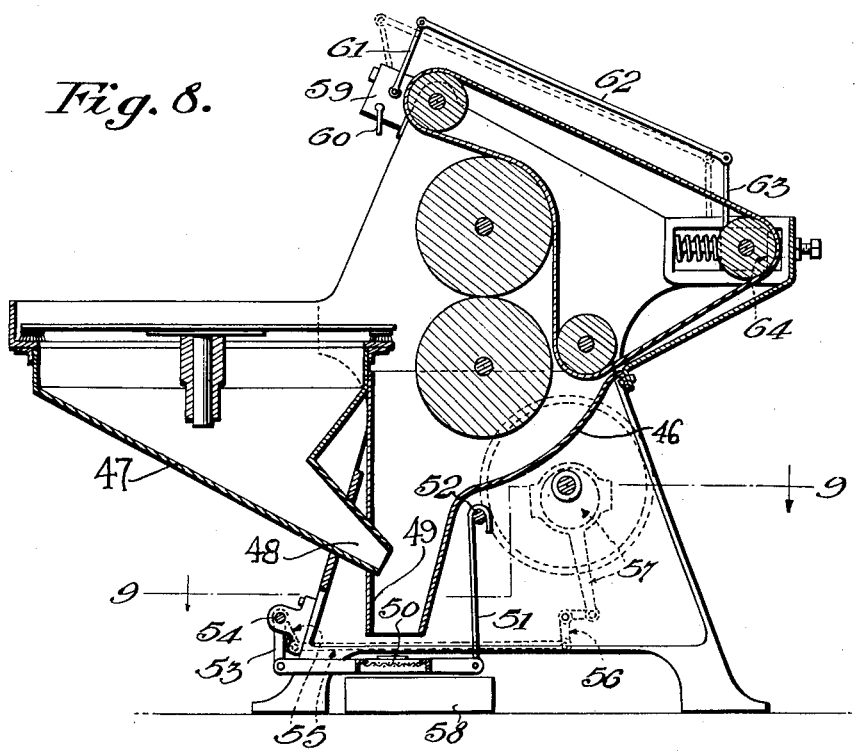
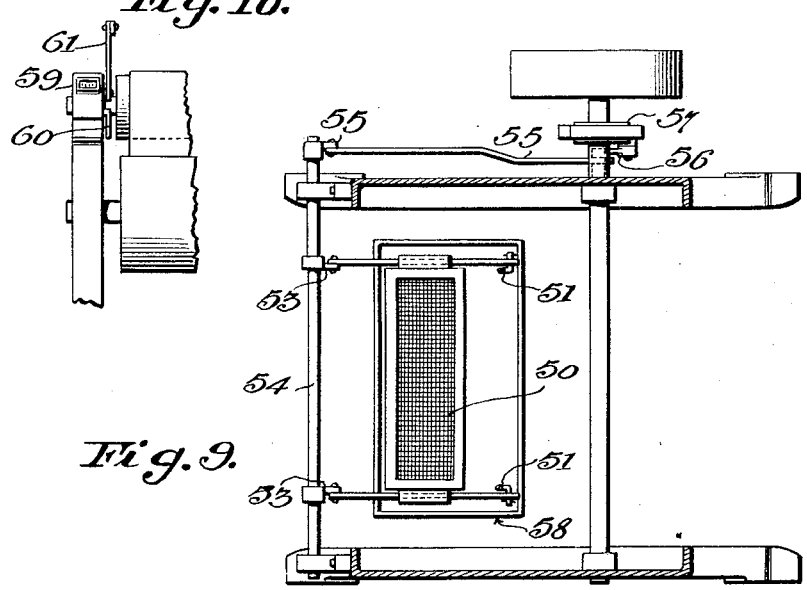
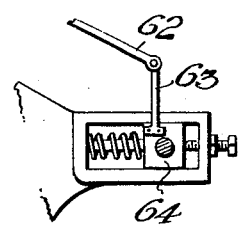
Inventors
Charles P. Wagner
Wiltz W. Wagner
By Baldwin & Wight
Attorneys Patented June 12, 1934

1,963,005

UNITED STATES PATENT OFFICE 1,963,005

FLOUR SAVING MEANS FOR DOUGH BRAKES

Charles P. Wagner and Wiltz W. Wagner, New Orleans, La.

Application April 16, 1932, Serial No. 605,724

18 Claims. (Cl. 107—7)

The invention relates generally to dough brakes of the character disclosed in our Patent No. 1,809,225, issued June 9, 1931, wherein is shown means for saving the dusting flour wasted during operation of the brake, and seeks to improve upon the invention disclosed in that patent by providing means not only for saving but also for sifting and returning reclaimed flour to a place conveniently accessible to the operator of the brake.

In machines of the character described it is customary to provide certain coacting rollers or turntables or both for receiving the dough being worked. In order to prevent sticking of the dough to these devices a considerable quantity of dusting flour is used and since a small portion only of this flour is worked up into the dough the major portion falls to the floor and is wasted.

Our present invention has for an object to provide novel means for collecting the wasted dusting flour, for sifting the collected flour, and for conveying the thus reclaimed flour to a magazine or storage box so positioned as to be readily accessible to the operator of the brake.

In machines of the character stated a turntable and cooperating belts and rollers usually are provided and the invention includes among its objects the provision of means to collect waste flour at both the turntable and the roll and belt portions of the machine and for delivering the waste flour to a sifting and returning mechanism common to both collecting means.

Another object of the invention is to provide a novel reclaimed flour magazine, a novel sifting and returning means including a pump or blower, and novel means to prevent undesirable building up of pressure within the magazine.

Another object of the invention is to provide a novel arrangement of waste flour collecting means associated with the turntable portion of the brake, collecting means associated with the roll and belt portion of the machine, and a collected flour sifting means common to, or in other words, to which collected waste flour is delivered from both collecting means.

Another object of the invention is to provide means for counting the number of times the dough is rolled so that an operator of the brake may keep accurate record of his work even though called away from the brake at intervals.

Other objects will in part be obvious and in part be pointed out hereinafter.

To the attainment of the aforesaid objects and ends, the invention still further resides in the novel details of construction, the combination and arrangement of parts, all of which will be first fully described in the following detailed description, then be particularly pointed out in the appended claims, reference being had to the accompanying drawings, in which:—

Figure 2 is a central vertical longitudinal section;

Figure 4 is a front elevation;

Figure 5 is a horizontal section taken on the line 5—5 on Figure 2;

Figure 7 is a detail sectional view illustrating one of the turntable carried ledge sweeping brushes;

Figure 8 is a view similar to Figure 2 and illustrates a modified arrangement of the invention;

Figure 9 is a horizontal section taken on the line 9—9 on Figure 8;

Figure 10 is an enlarged detail front elevation of the register; and

Figure 11 is an enlarged detail sectional view illustrating the mounting of the register operating member.

Figure 1:
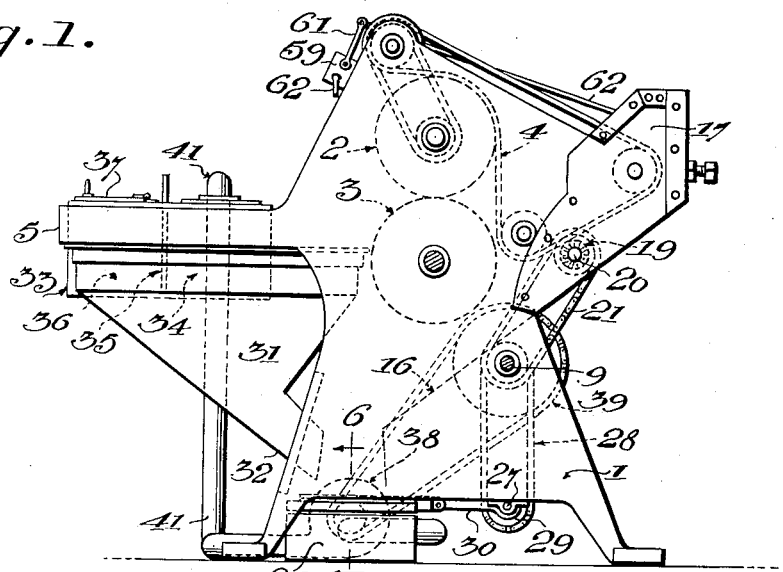
Figure 1 is a side elevation of a machine equipped with the invention.

In the drawings in which like numerals of reference indicate like parts in all of the figures, 1 generally designates the frame of a dough brake of a conventional form in which is provided the usual coacting rollers 2 and 3 and the cooperating belt 4. As is customary the frame also includes a forwardly extended open flange 5 within which the usual turntable 6 is mounted with its depending vertical shaft 7 having free rotation bearing as at 8 in the cross web supported by the flange 5.

A main shaft 9 is journaled in the frame 1 and is equipped at one end with a flywheel 10 to which power may be applied for operating the dough brake and at its other end with a gear 11. The gear 11 meshes with a gear 12 mounted on the lower roll shaft, said roll shaft being equipped at its other end with a gear 13 adapted to mesh with a gear 14 carried by the upper roll shaft, one of the roll shafts being sprocket and chain connected as at 15 with one of the belt rolls so that the rolls 2 and 3 and the belt 4 will be driven from the main shaft 9.

All of the parts above mentioned are more or less conventional and are disclosed in our previous Patent No. 1,809,225, issued June 9, 1931 and in the Bohnet Patent No. 1,551,131, issued August 25, 1925. In our previous patent we disclosed means for collecting and reclaiming wasted dusting flour and in our present invention we seek to improve upon the disclosure of our previous patent by providing means not only for collecting wasted dusting flour at the turntable and belt and roller portions of the brake, but also means to sift the collected flour and deliver it to a place accessible to the operator of the dough brake so that he may conveniently reuse the reclaimed flour.

In our present invention we utilize a waste flour collecting chute 16 which is supported on a forwardly and downwardly directed incline beneath the belt and roller portion of the dough brake through the medium of the side wings 17 which may be secured in any approved manner to the brake frame and which serve to support the rear keeper hood 18.

A rotary brush 19 is positioned beneath and in engagement with the belt 4, being carried by a cross shaft 20 suitably supported in the frame and driven by sprocket and chain connections 21 from the main shaft 9. The brush 19 serves to sweep off surplus dusting flour which may tend to cling to belt 4 causing it to fall upon and be directed forwardly and downwardly by the chute 16.

At its forward end the chute 16 terminates in a downwardly directed skirt 22 delivering onto a reciprocating screen or sifter 23 supported in a suitable frame 24 and reciprocable in guideways 25. The collected waste dusting flour, freed of all lumps or other undesirable particles and thus reclaimed for repeated use by the screen 23 is deposited into a receiver box 26 positioned beneath the screen.

A cross shaft 27 is mounted in suitable bearings supported by the frame 1 and has rotation imparted thereto through the medium of the pulley and chain connections 28 with the main shaft 9. The shaft 27 is equipped with a pair of eccentrics 29 which are strap connected as at 30 to the screen frame 24 and which serve to impart reciprocation to said frame so as to effectively sift the flour deposited upon the screen 23.

A waste flour collecting hopper 31 is suspended beneath and collects waste flour from the turntable portion of the dough brake and this hopper delivers the collected waste dusting flour onto the sifter frame through a depending spout 32.

At one side of the turntable a dusting flour storage box or magazine 33 is mounted so as to be readily accessible to the operator of the dough brake. The magazine 33 includes a rear or receiving compartment 34 which is separated by a removable partition 35 from a front or magazine compartment 36, the reclaimed flour within the latter being accessible through the hinged cover 37.

One of the objects of the invention is to provide means for delivering the reclaimed dusting flour deposited in the receiving box 26 to the receiving compartment 34 of the magazine 33. In this particular disclosure we have shown pneumatic means for delivering the reclaimed flour, but it is to be understood that other means for accomplishing this purpose is comprehended within the scope of the invention as pointed out in the appended claims. In this exemplary illustration we have disclosed a pump or blower 38 driven by power transmitting means 39 from the main shaft 9 and connected by a suction duct 40 with the receiver box 26 and by a delivery duct 41 with the receiving compartment 34 of the magazine 33. If desired the intake port or duct 40 may be equipped with a fine mesh screen to further assure thorough sifting of the dusting flour before delivery into the magazine 33.

The receiving compartment 34 is provided with an opening 42 for permitting air escape. This opening preferably surrounds the delivery duct 41 and is covered by a fine mesh cloth covering which may be wire protected if desired and serves to permit air escape while preventing escape of dusting flour delivered into the magazine.

An auxiliary intake or suction duct 43 may be connected with the suction duct 40 if desired and this auxiliary duct may be utilized to draw dusting flour, in its original state or reclaimed, from sources other than the dough brake herein described.

If desired brushes 44 may be attached to the turntable, as shown in Figures 1, 4 and 7, to rotate therewith for the purpose of sweeping the flange ledge 45 free of the waste dusting flour which tends to collect thereon.

In Figures 8 and 9 we have illustrated a modified form of the invention in which a collecting boot 46 is supported in any approved manner beneath the roller and belt portion of the machine. The hopper 47 depending beneath the turntable may have its delivery throat 48 projected into the delivery throat 49 of the boot so that they together deliver onto the sifter screen 50. The boot and the hopper may, of course, deliver individually but it will be noted that the effect in each case would be to have a single sifter which receives waste flour collected from the turntable portion and from the roll and belt portion of the dough brake.

In this instance the sifter screen 50 is supported at its rear end upon links 51 suspended from the frame rod 52, and at its front end on crank arms 53 depending from the rock shaft 54. The shaft is crank and link connected as at 55 to one arm of a bell crank lever 56 pivotally mounted on the brake frame and to which movement is imparted for shaking the screen by the eccentric and strap equipment 57.

Figure 3:
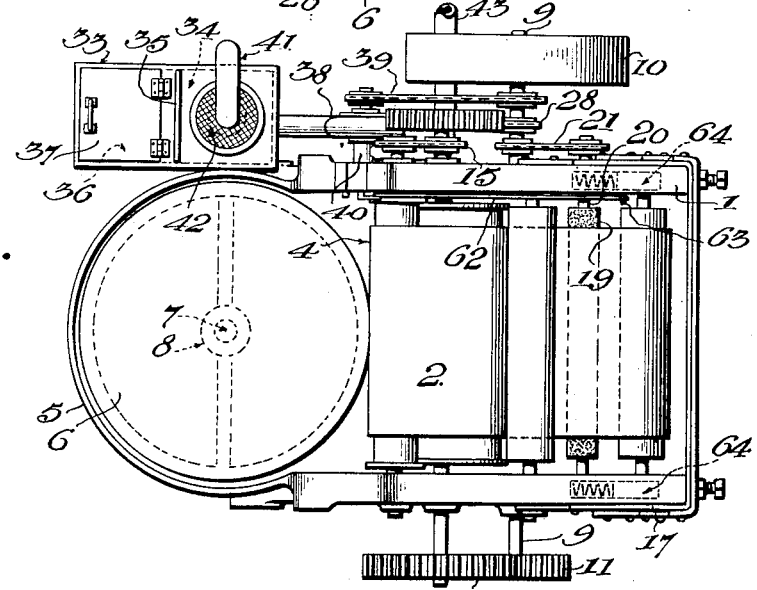
Figure 3 is a plan view.
Figure 6:
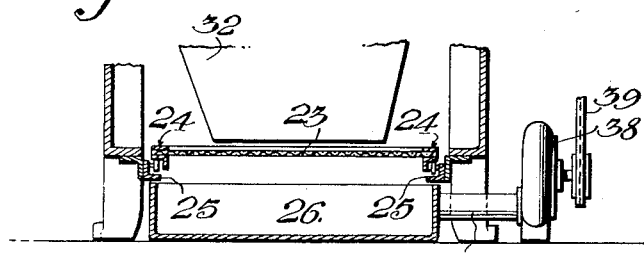
Figure 6 is an enlarged detail vertical cross section taken on the line 6—6 on Figure 1.

The sifted flour falling through the screen 50 may be collected in a pan or drawer 58 mounted beneath the screen and which may be withdrawn to enable removal of the reclaimed flour, or mechanical means may be employed as shown in Figures 1 and 3 for delivering the reclaimed flour to a place accessible to the operator of the brake.

In an effort to assure the rolling of a batch of dough the proper number of times we provide a register mechanism comprising a counter or register 59 of any approved construction and which, as usual, may be hand set by use of the finger piece 60 and includes the oscillatable operating lever 61. The lever 61 is link connected as at 62 to a shifter member 63 rigidly secured to one of the spring pressed slidable journal blocks 64 which support the rearmost belt roll. See Figures 2, 8 and 11.

Each time the dough is rolled between the rollers and belt, the belt will be moved away from the roller 2 causing the rearmost belt roll blocks 64 to move forwardly. This movement of the blocks 64 causes the member 63 and link 62 to actuate the counter.

Thus the counter 59 registers each rolling of the dough and an operator is thus able to keep account of the rollings even though he is called away from the brake at intervals.

In the foregoing description we have disclosed a simple dusting flour reclaiming means including individual collecting devices cooperating respectively with the turntable and the roller and belt portions of the brake, a sifting mechanism common to both collecting devices, and means for delivering the reclaimed dusting flour to a magazine accessible to the operator of the dough brake so that the reclaimed flour may be conveniently reused.

From the foregoing description taken in connection with the accompanying drawings it is thought that the novel details of construction, the manner of use and the advantages of our invention will be readily apparent to those skilled in the art to which the invention relates.

We claim:

1. In a dough brake, waste dusting flour collecting means into which the waste flour falls by gravity, means for sifting the flour as it falls into the collecting means, a reclaimed dusting flour receiving magazine, and means including suction and delivery ducts and a cooperating blower to deliver the collected and sifted flour to the magazine.

2. In a dough brake, waste dusting flour collecting means, collected flour sifting means, a reclaimed dusting flour receiving magazine, and means including a blower, a suction duct communicating between the sifting means and the blower and a delivery duct communicating between the blower and the magazine to deliver the collected and sifted flour to the magazine, and an air expelling flour retaining screened opening in the magazine.

3. In a dough brake, waste dusting flour collecting means, collected flour sifting means, a reclaimed dusting flour receiving magazine, and means including a blower, a suction duct communicating between the sifting means and the blower and a delivery duct communicating between the blower and the magazine to deliver the collected and sifted flour to the magazine, said magazine having an opening surrounding the delivery duct covered with fine mesh cloth capable of permitting passage of air and of retaining the reclaimed flour delivered to the magazine.

4. In a dough brake, waste dusting flour collecting means, collected flour sifting means, a reclaimed dusting flour receiving magazine having a removable partition dividing it into a receiving compartment and a magazine compartment accessible to the operator of the brake, and means to deliver the collected and sifted flour to the receiving compartment.

5. In a dough brake, waste dusting flour collecting means, collected flour sifting means, a reclaimed dusting flour receiving magazine having a removable partition dividing it into a receiving compartment and a magazine compartment accessible to the operator of the brake, and means including a blower, a suction duct communicating between the sifting means and the blower and a delivery duct communicating between the blower and the magazine to deliver the collected and sifted flour to the magazine compartment, and an air expelling flour retaining screened opening in the magazine compartment.

6. In a dough brake, a dusting flour magazine having a removable partition dividing it into a receiving compartment and a magazine compartment accessible to the operator of the brake, and means including a blower, a suction duct communicating between a source of dusting flour and the blower and a delivery duct communicating between the blower and the magazine compartment to deliver dusting flour to the magazine compartment, and an air expelling flour retaining screened opening in said magazine compartment.

7. In a dough brake wherein is provided cooperating belt and roller equipment for working the dough and driving means therefor, waste flour collecting means, a shaker sifter for the collected flour, and means to shake the sifter driven from the belt and roller equipment driving means.

8. In a dough brake wherein is provided cooperating belt and roller equipment and driving means therefor, waste flour collecting means, a power operated brush for engaging and removing flour from the belt and causing it to be collected by said collecting means, a shaker sifter for the collected flour and means for driving the brush and for shaking the sifter driven from the belt and roller equipment driving means.

9. In a dough brake wherein is provided a turntable portion and a belt and roller portion, a waste flour collector associated with the turntable portion, a waste flour collector associated with the belt and roller portion, a sifter screen onto which both collectors deliver, a receiver beneath the screen, a magazine accessible to the operator of the brake, and means for delivering the sifted flour from the receiver to the magazine.

10. In a dough brake, waste dusting flour collecting means, collected flour sifting means, a reclaimed dusting flour receiving magazine, and means including a blower, a suction duct communicating between the sifting means and the blower and a delivery duct communicating between the blower and the magazine to deliver the collected and sifted flour to the magazine, and an auxiliary suction duct entering the first mentioned suction duct between the blower and the collecting means, said magazine having an opening surrounding the delivery duct covered with fine mesh cloth capable of permitting passage of air and of retaining the reclaimed flour delivered to the magazine.

11. In a dough brake wherein is provided cooperating belt and roller equipment for working the dough and driving means therefor, an agitated waste flour sifter, means actuated from the belt and roller equipment driving means for agitating the sifter, and means to collect waste flour and deliver it to the sifter.

12. In a dough brake wherein is provided a turntable and a frame ledge beneath the turntable, the combination of a waste flour collecting means associated with the turntable, and means carried by and movable with the turntable for sweeping the ledge to cause waste flour collecting thereon to fall into said collecting means.

13. In a dough brake wherein is provided a turntable and a frame ledge beneath the turntable, and brushes depending from the turntable and engageable with said ledge for preventing accumulation of waste flour on said ledge.

14. In a dough brake wherein is provided a turntable and dough working belt and roller equipment, the combination with the turntable of a waste flour collecting hopper supported beneath the turntable to collect waste flour falling therefrom, waste flour collecting means beneath the belt and roller equipment for collecting waste flour falling therefrom, said hopper and said collecting means having a common discharge outlet, a receiver box beneath the common outlet, a slidable sifter screen interposed between the common outlet, and the box and means to reciprocably slide the screen.

15. In a dough brake wherein is provided a turntable and dough working belt and roller equipment, the combination with the turntable of a waste flour collecting hopper supported beneath the turntable to collect waste flour falling therefrom, waste flour collecting means beneath the belt and roller equipment for collecting waste flour falling therefrom, said hopper and said collecting means having a common discharge outlet, a receiver box beneath the common outlet, a slidable sifter screen interposed between the common outlet and the box, means to drive the belt and roller equipment, and means including eccentric and strap connections for reciprocably sliding the screen from said belt and roller equipment driving means.

16. In a dough brake, the combination with the turntable, of a waste flour collecting hopper supported beneath the turntable to collect waste flour falling therefrom, and having a delivery spout, a receiver box beneath the spout to receive flour delivered therethrough, a sifter screen interposed between the spout and the box, a reuse magazine, and means including a suction duct entering said box and a delivery duct entering said magazine and a cooperating blower to deliver flour from the box to the magazine.

17. In a dough brake wherein is provided a turntable and dough working belt and roller equipment, the combination with the turntable of a waste flour collecting hopper supported beneath the turntable to collect waste flour falling therefrom, waste flour collecting means beneath the belt and roller equipment for collecting waste flour falling therefrom, said hopper and said collecting means having a common discharge outlet, a receiver box beneath the common outlet, a sifter screen interposed between the common outlet and the box, a reuse magazine, and means including a suction duct entering said box and a delivery duct entering said magazine and a cooperating blower to deliver flour from the box to the magazine.

18. In a dough brake wherein is provided a turntable portion and a belt and roller portion, a waste flour collector associated with the turntable portion, a waste flour collector associated with the belt and roller portion, and means including a sifter for sifting the waste flour to render it fit for reuse as a dusting flour and a conveyor for delivering the sifted flour to a place from which it may be reused, said last named means being common to both collecting means.

CHARLES P. WAGNER.
WILTZ W. WAGNER.